Feb. 28, 1967 W. THÜRMEL ETAL 3,306,792
CONTINUOUSLY REGENERATING COPPER-CONTAINING ETCHING SOLUTIONS
Filed Aug. 5, 1963
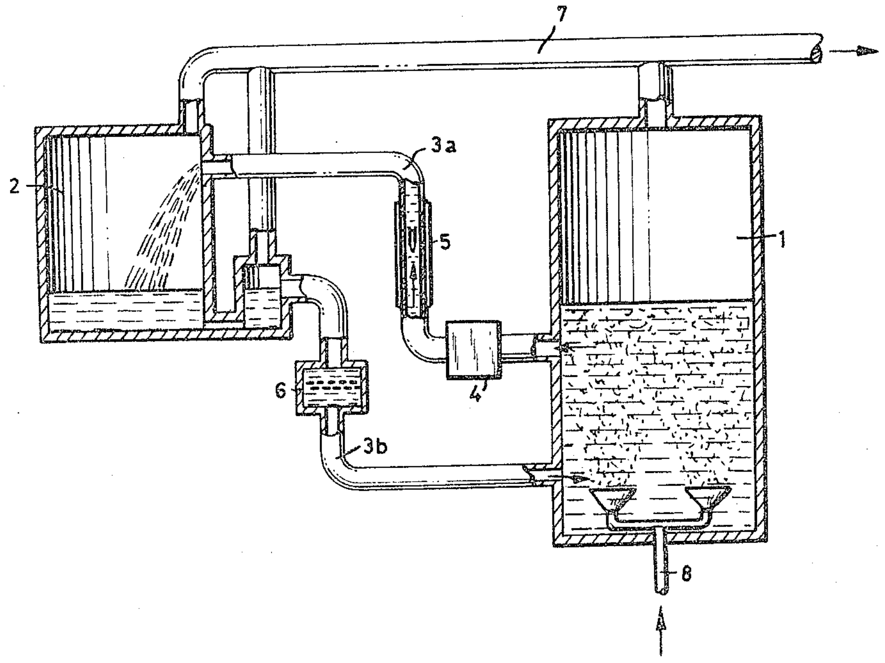

United States Patent Office 3,306,792
Patented Feb. 28, 1967

3,306,792
CONTINUOUSLY REGENERATING COPPER-CONTAINING ETCHING SOLUTIONS

Werner Thürmel, Rudolf Voh, and Eftimios Konstantouros, Munich, Germany, assignors to Siemens & Halske Aktiengesellschaft Berlin and Munich, a corporation of Germany Filed Aug. 5, 1963, Ser. No. 299,839
8 Claims. (Cl. 156—19)

The invention disclosed herein is concerned with a method of and apparatus for continuously regenerating copper-containing etching solutions used especially in connection with the production of so-called printed circuits.

It is known to use copper-II-chloride (cupric) solutions for the etching of printed circuits made of copper-clad insulating boards or plates. It is likewise known to inject during the etching, air into the etching device for the purpose of oxidizing the copper-I-ions (cuprous) produced in the etching, so as to form again copper-II-ions, whereby the etching solution is regenerated, that is, its etching function is retained. The reactions which whereby take place are as follows:

Etching: $Cu+CuCl_2 \rightarrow 2CuCl$
Regenerating: $2\ CuCl+\frac{1}{2}O_2+2HCl \rightarrow 2CuCl_2+H_2O$.

In order to avoid crystal formation due to the increase of copper concentration, taking place in such reaction, it is necessary to remove from time to time an amount of the etching solution and to replace it by a corresponding amount of a solution which is free of copper, at the same time also adding hydrochloric acid which is consumed in the regeneration process.

It was found in the application of this etching method, that the regeneration speed does not keep pace with the etching speeds which are operationally required, so that the etching solution is after a short time exhausted. However, if the etching speed is matched to the slight regeneration speed, the relatively small amount of etching solution, contained in the etching device, will after the etching of only small copper amounts, be enriched with copper chloride, to such an extent, that the above mentioned change of the bath will be required already after the etching of a few plates. The passage of air through the etching device results in the formation of fog above the solution, thereby endangering the operating personnel incident to the manipulation of the etching material.

The object of the invention is to provide a method which avoids the above indicated drawbacks and which is readily adapted for use in a production process. Moreover, there shall be created optimum conditions for the etching time as well as for the exchange of the bath and for the control thereof, whereby the precipitation of concentrations is reliably avoided.

The method according to the invention, as applied for the continuous regeneration of copper-II-chloride etching solutions containing hydrochloric acid and in given cases a chloride, preferably ammonium chloride, which become enriched with copper-I-ions, in the process of etching copper or copper alloys, such as tin bronze, especially in the production of printed circuits upon copper-clad insulating boards or plates, whereby the regeneration is carried out with oxygen-containing gas, comprises, effecting the etching and the regeneration in separate devices, causing the etching solution to flow through the respective devices in timed manner or continuously, adjusting between the etching operation and the regeneration of the etching solution an equilibrium, by oxidation with the oxygen-containing gas, whereby as many Cu-I-ions are in an average time interval oxidized to Cu-II-ions, which are adapted for the etching, as there are produced Cu-I-ions in the etching operation, continuously or in timed manner removing the copper excess produced in the etching operation, replacing the removed amount of etching solution by an aqueous solution in the corresponding amount, said aqueous solution containing hydrochloric acid and the chloride which has been consumed in the regeneration and withdrawn with the removed amount of etching solution.

The method according to the invention offers the following advantages:

The etching device may comprise customary, readily available components. The regeneration vessel can be constructed irrespective of the etching operation, so that the required regeneration speed is always reached; it may be made in the simplest form, of a relatively high upright container having disposed at the bottom thereof perforated spray members through which the oxygen-containing gas is introduced in finely divided form, thus providing between the etching solution and the oxygen-containing gas a large boundary as well as a long retention time of the oxygen-containing gas in the etching solution. The amount of oxygen-containing gas required for the intended regeneration speed will depend upon the oxygen content of the gas employed. It is, however, also possible to spray the etching solution for the regeneration, in the regeneration vessel, into a stream of the oxygen-containing gas. The size of the regeneration device can be adapted, as desired, to the prevailing operating requirements; for example, it may be dimensioned so that it also serves as a supply storage vessel, so that the exchange of the bath will be required, for example, only once per day.

There will not be produced any fog above the etching solution in the etching device, and the latter can therefore be opened and closed as desired, without producing any danger for the operating personnel.

In a completely continuous operation of the system, that is, in a case in which the bath solution is withdrawn and continuously replaced by a substitute solution, the total composition of the etching solution is held constant within close limits, so as to make it possible to provide for optimum concentration conditions in favor of a high etching speed. The etching time will then remain practically constant. However, even in the case of exchange of the etching solution in timed manner, the etching time will fluctuate only within slight limits, for example, less than 10 percent, when the total copper concentration increases within an exchange period by about 10 percent.

The method according to the invention is economical, as the regeneration medium, upon using air, may be obtained without great expenditure. The maintenance does not cause any particular difficulties, as it merely requires to exchange excess etching solution for a substitute solution, so that the composition of the solution, and therewith the etching time, remain nearly constant. The control of the etching solution with respect to its copper content, can be effected by density measurements, and the distribution of the copper with respect to Cu-I-ions and Cu-II-ions, can be in known manner established by color comparison.

The copper can be separated from the excess copper-II-chloride etching solution, by simple chemical reaction. However, it is also possible to use in known manner, for the production of the copper-clad insulating plates, the copper-II-etching solution which had been withdrawn for the separation of the excess copper. A closed cycling circulation can be established in this manner, wherein the copper which had been etched off, is oxidized in a regeneration device, and thereupon withdrawn as excess copper-II-chloride, and used for the production of the copper-clad insulating plates. Copper must be supplied to this cycling circulation, for the copper plating of the insulating plates, in an amount which merely corresponds to that which is removed from insulating plates upon the etching thereof.

Further details will appear from the description which is rendered below with reference to the accompanying drawing showing a device for practicing the method according to the invention.

According to the invention, the continuous regeneration of a copper-II-chloride (cupric) etching solution which is being enriched by copper-I-ions (cuprous ions), is effected in a relatively high column of liquid contained in a vessel 1, such vessel communicating for the cycling circulation with the etching device 2 by way of conduits 3*a* and 3*b*. The vessel 1 contains perforated spray-like members disposed at the bottom thereof, through which compressed air is introduced in finely divided form for the oxidation. Filtered compressed air is injected so as to exclude dirt particles which might cause clogging of the inlet sprays.

The circulation of the etching solution is effected by the action of a pump 4 which drives the regenerated etching solution from the vessel 1 through the conduit 3*a* into the etching device 2. Numeral 5 indicates a flow meter for controlling the operation of the pump so as to reliably maintain circulation. Numeral 6 indicates a filter for continuously cleaning the etching solution of coarse constituents, The regeneration vessel 1 is exhausted by way of a corrosion-protected exhaust 7 to which the etching device 2 can also be connected. Compressed air is introduced through the conduit 8. The etching device and the regeneration device may be made of known and suitable synthetic material, glass or other known and suitable corrosion resistant materials.

The concentration of the etching solution is preferably so adjusted that no solubility product is exceeded at the respective operating temperatures. For example, the following concentrations have been found favorable at room temperature:

(a) copper chloride 0.5–2.5 mole/l.;
(b) ammonium chloride 2.5–0.5 mole/l.;
(c) hydrochloric acid 0.2–0.6 mole/l.

whereby the sum of the concentrations (a) and (b) shall preferably amount to 3.0 mole/l. An increase, for example, of the hydrochloric acid concentration, for example, by 0.5 mole/l., requires lowering of the sum concentrations (a) and (b) by about 0.3 mole/l. so as to avoid exceeding a solubility product.

For example, upon using 10 liters of an etching solution of the following optimum concentration, namely, 1.0 mole copper-II-chloride/l., 1.5 mole ammonium chloride/l., 0.6 mole hydrochloric acid/l., the total copper concentration is increased to 1.1 mole, by 1 mole copper that had been etched off; the concentration for hydrochloric acid and for ammonium chloride remaining the same. Upon regenerating this etching solution, the total copper concentration is not altered; only the copper-I-chloride forming in the etching operation according to the formula $$CuCl_2+Cu\pm{}^{\circ}\rightarrow 2CuCl$$

is by air oxidation in acid solution according to $$2CuCl+\tfrac{1}{2}O_2+2HCl\rightarrow 2CuCl_2+H_2O$$

transformed again into copper-II-chloride which has etching properties. In this process are consumed 2 mole hydrochloric acid per mole of copper etched off, so that the hydrochloric acid concentration now amounts to 0.4 mole/l. The concentration of ammonium chloride has not been altered since it is not consumed; only the $Cl^-$-ions thereof serving for the transformation of the unsoluble copper-I-chloride into a soluble complex $(CuCl_2)^-$. Upon using this etching solution which is enriched with copper-II-chloride but poor with respect to hydrochloric acid, for etching off further copper, the total copper concentration will increase again, while the hydrochloric acid content is further diminished, the volume of the etching solution remaining, however, unchanged.

In order to avoid increase of the copper concentration to such an extent that there is formed, due to exceeding the solubility product, a precipitate of $2NH_4Cl\cdot CuCl_2\cdot 2H_2O$, or that copper hydroxide falls out due to excessively low hydrochloric acid concentration, part of the copper-II-chloride solution is removed and replaced by a like amount of an aqueous solution of ammonium chloride and hydrochloric acid, such aqueous solution replacing the removed ammonium chloride as well as hydrochloric acid consumed in the regeneration and contained in the removed part of the solution. However, the exchange is in practice effected as required for maintaining a constant etching time, before precipitates are formed in the etching solution. It is in connection with the present example advantageous to effect the exchange at a total copper concentration amounting to 1.1 mole/l.

Changes may be made within the scope and spirit of the appended claims which define what is believed to be new and desired to have protected by Letters Patent.

We claim:

1. A method of continuously etching copper or copper alloys with an aqueous copper-II-etching (cupric) solution containing hydrochloric acid and ammonium chloride, which solution becomes enriched with copper-I-ions (cuprious ions) incident to the etching, and continuously regenerating the etching solution, whereby the regeneration is effected by an oxygen-containing gas and an amount of the solution containing the excess of copper ions, produced in the etching operation is removed from the etching solution and is replaced by a like amount of an aqueous solution containing hydrochloric acid corresponding to the amount consumed in the regeneration and withdrawn with the removed amount, and also containing ammonium chloride corresponding to the amount withdrawn with the removed amount of etching solution, comprising the steps of carrying out the etching and the regeneration, respectively, in separate devices through which the etching solution is caused to flow, injecting the oxygen-containing gas effecting the regeneration in finely dispersed form to maintain large boundary areas between the etching solution and the oxygen-containing gas and to secure extended retention of the gas in the etching solution, for the regeneration of the latter, thereby adjusting an equilibrium between the etching operation and the regeneration of the etching solution with the oxygen-containing gas.

2. A method according to claim 1, wherein the concentrations, in the etching solution, of copper chloride, ammonium chloride and hydrochloric acid, are mutually so proportioned that no solubility product is exceeded at the respective prevailing operating temperature.

3. A method according to claim 2, wherein the concentrations of the etching solution are at room temperature approximately within the following limits, namely, 0.5–2.5 mole/l. copper chloride; 2.5–0.5 mole/l. ammonium chloride; and 0.2–0.6 mole/l. hydrochloric acid.

4. A method according to claim 2, wherein the etching solution is composed of 1.0–1.1 mole/l. copper chloride; 1.5 mole/l. ammonium chloride; and 0.6–0.4 mole/l. hydrochloric acid.

5. A method according to claim 2, comprising forming a stream of oxygen-containing gas, and spraying the etching solution into said stream, whereby large border areas are formed between the etching solution and the gas and the latetr is caused to dwell in the gas for an extended time, so as to secure the regeneration of the etching solution.

6. A method according to claim 2, wherein compressed air constitutes the oxygen-containing gas.

7. A method according to claim 2, wherein the speed of regeneration is determined by the amount of oxygen-containing gas which is caused to flow through the etching solution.

8. A method according to claim 2, wherein the speed of regeneration is determined by the oxygen content of the gas which is caused to flow through the etching solution.

References Cited by the Examiner

UNITED STATES PATENTS

| | | | |
|---|---|---|---|
| 1,313,233 | 8/1919 | Grass | 156—19 |
| 2,908,557 | 10/1959 | Black et al. | 156—19 |
| 3,083,129 | 3/1963 | Jones et al. | 156—19 |

OTHER REFERENCES

Etchant Keeps Renewing Self., Electronics, May 2, 1958, pp. 24, 25.

JACOB STEINBERG, *Primary Examiner.*